US012790799B2

(12) United States Patent
Lea et al.

(10) Patent No.: US 12,790,799 B2
(45) Date of Patent: Nov. 10, 2026

(54) FLUID FLOW CONTROL VALVE ASSEMBLY

(71) Applicant: KOHLER MIRA LIMITED, Cheltenham (GB)

(72) Inventors: Ben Lea, Cheltenham (GB); Daniel Griffiths, Cheltenham (GB); Oliver Jones, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 283 days.

(21) Appl. No.: 18/349,529

(22) Filed: Jul. 10, 2023

(65) Prior Publication Data

US 2024/0018760 A1 Jan. 18, 2024

(30) Foreign Application Priority Data

Jul. 15, 2022 (GB) ..................................... 2210406

(51) Int. Cl.
*E03C 1/04* (2006.01)
*F16K 1/12* (2006.01)
(Continued)

(52) U.S. Cl.
CPC .......... *E03C 1/0408* (2013.01); *E03C 1/0412* (2013.01); *F16K 11/04* (2013.01);
(Continued)

(58) Field of Classification Search
CPC ...... E03C 1/0408; E03C 1/0412; F16K 11/04; F16K 11/044; F16K 11/074; F16K 11/22;
(Continued)

(56) References Cited

U.S. PATENT DOCUMENTS 2,615,671 A 10/1952 Landon
4,219,044 A 8/1980 Wilson
(Continued)

FOREIGN PATENT DOCUMENTS

CA 2354467 A1 1/2002
CA 3131464 A1 4/2022
(Continued)

OTHER PUBLICATIONS

Chinese Office Action dated Aug. 18, 2026 issued in the corresponding Chinese Application.

*Primary Examiner* — Daphne M Barry
(74) *Attorney, Agent, or Firm* — Husch Blackwell LLP

(57) ABSTRACT

A fluid flow control valve assembly is provided, and includes a fluid flow control valve which includes a first flow control member having one or more flow channels, and a second flow control member adjacent to the first flow control member. The second flow control member moves relative to the first flow control member. A first valve actuator causes movement of the second flow control member relative to the first flow control member. An operating member connects to the first valve actuator. The operating member moves in a linear direction and the operating member on the first valve actuator moves the second flow control member. Movement of the second flow control member adjusts the position of the second flow control member relative to the one or more flow channels in the first flow control member such that a flow rate through the fluid flow control valve may change.

17 Claims, 11 Drawing Sheets

(51) Int. Cl.

| | |
|---|---|
| ***F16K 11/00*** | (2006.01) |
| ***F16K 11/04*** | (2006.01) |
| ***F16K 11/044*** | (2006.01) |
| ***F16K 11/074*** | (2006.01) |
| ***F16K 11/22*** | (2006.01) |
| ***F16K 31/52*** | (2006.01) |
| ***F16K 31/60*** | (2006.01) |

(52) U.S. Cl.
CPC .......... *F16K 11/044* (2013.01); *F16K 11/074* (2013.01); *F16K 11/22* (2013.01); *F16K 19/006* (2013.01); *F16K 31/52* (2013.01); *F16K 31/602* (2013.01); *F16K 1/12* (2013.01); *Y10T 137/9464* (2015.04)

(58) Field of Classification Search
CPC ...... F16K 19/006; F16K 31/52; F16K 31/602; F16K 1/12; Y10T 137/9464
USPC .......................................................... 137/801
See application file for complete search history.

(56) References Cited

U.S. PATENT DOCUMENTS

| | | | |
|---|---|---|---|
| 5,295,429 | A | 3/1994 | Monk |
| 11,067,197 | B2 | 7/2021 | Glaser et al. |
| 2001/0025939 | A1 | 10/2001 | Lee |
| 2018/0313066 | A1 | 11/2018 | Ye et al. |

FOREIGN PATENT DOCUMENTS

| | | | |
|---|---|---|---|
| CN | 107387790 | A | 11/2017 |
| DE | 102019103609 | A1 | 8/2020 |

FLUID FLOW CONTROL VALVE ASSEMBLY

CROSS REFERENCE

This application claims priority to UK Application No. GB2210406.1, filed 15 Jul. 2022, the entirety of which is hereby incorporated by reference.

FIELD OF THE INVENTION

The present disclosure relates to a fluid flow control valve assembly for controlling a flow of fluid through an ablutionary fitting. The disclosure also relates to a controller for use in a plumbing system or an ablutionary system comprising such a fluid flow control valve assembly and to a plumbing system or an ablutionary system comprising such a fluid flow control valve assembly and/or such a controller.

BACKGROUND

In a shower system, a means operable to produce a principal stream of water having a user-desired temperature may be employed. The means operable to produce the principal stream of water having the user-desired temperature may include, for example, a mixer valve, e.g. a thermostatic mixer valve, or an instantaneous water heater. The principal stream of water having the user-desired temperature is then conveyed to a fluid delivery device such as a shower head. Typically, the shower system may comprise one or more user input means operable to control the temperature and/or the flow of water delivered by the fluid delivery device.

BRIEF DESCRIPTION OF THE DRAWINGS

Example embodiments will now be described with reference to the accompanying drawings, in which.

DETAILED DESCRIPTION OF THE DRAWINGS

Figure 1:
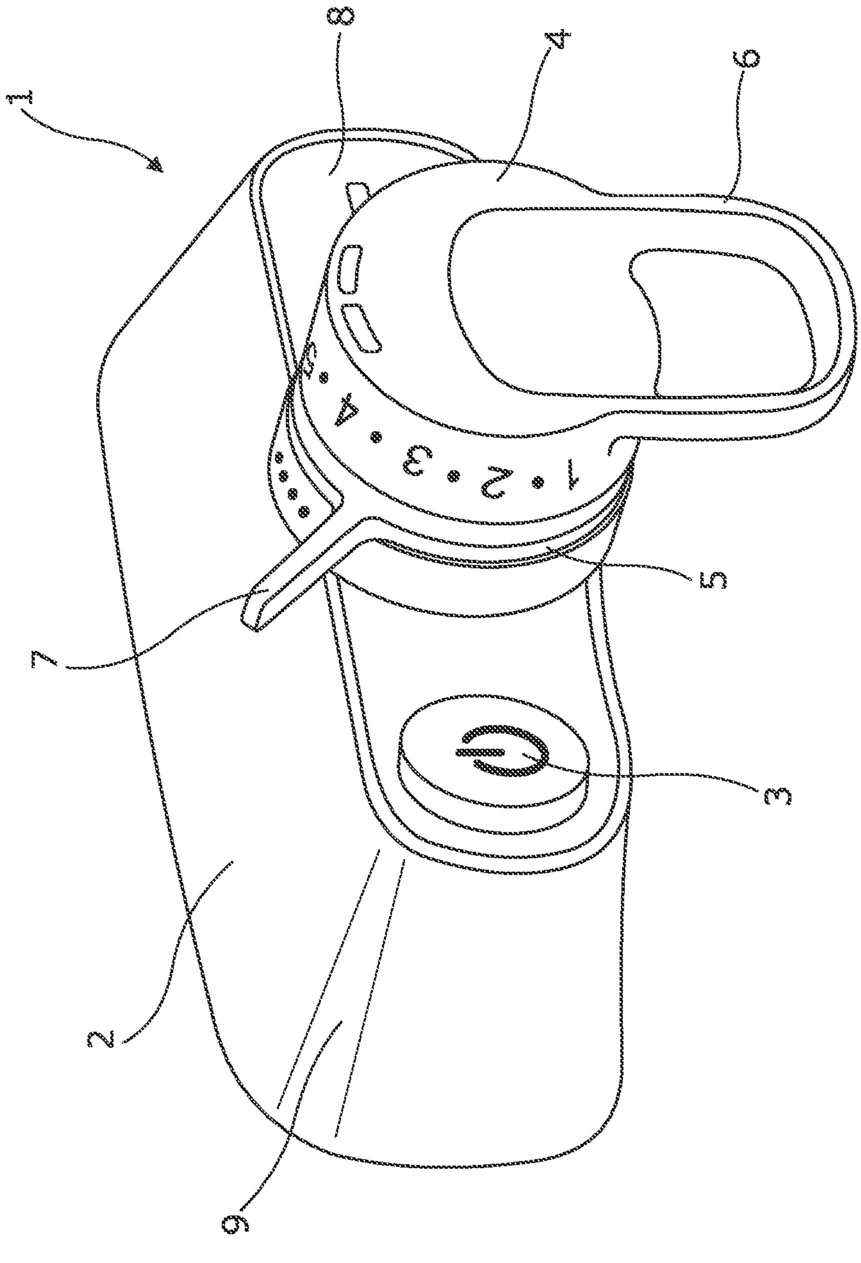
FIG. 1 shows an example of a shower controller.

A first aspect provides a fluid flow control valve assembly for controlling a flow of fluid through an ablutionary fitting comprising a fluid flow control valve. The fluid flow control valve includes a first flow control member having one or more flow channels, a second flow control member disposed adjacent to the first flow control member, the second flow control member being moveable relative to the first flow control member. The fluid flow control valve assembly includes a first valve actuator arranged to cause movement of the second flow control member relative to the first flow control member, as well as an operating member operably connected to the first valve actuator. In use, the operating member is operable to be moved in a linear direction and the operating member acts in turn on the first valve actuator to move the second flow control member, wherein movement of the second flow control member adjusts the position of the second flow control member relative to the one or more flow channels in the first flow control member such that a flow rate through the fluid flow control valve may be increased or decreased.

The fluid flow control valve assembly may allow for relatively fine user control of the flow of fluid through the ablutionary fitting.

The first flow control member and the second flow control member may be arranged such that the fluid flow rate through the fluid flow control valve is always a non-zero value.

The first valve actuator may be arranged to cause linear movement of the second flow control member relative to the first flow control member.

The first valve actuator may comprise a lever.

The second flow control member may be movable linearly relative to the first flow control member.

The first valve actuator may be arranged to cause rotation of the second flow control member relative to the first flow control member.

The second flow control member may be rotatable about an axis perpendicular to the second flow control member. The axis may be a central axis perpendicular to the second flow control member.

The first flow control member may be a first flow control plate.

The second flow control member may be a second flow control plate.

One or more of the flow channels may comprise an aperture passing through the first flow control member.

In an implementation, a length of the operating member may be adjustable.

The length of the operating member may be adjustable between a plurality of discrete lengths.

For instance, one or more connecting pieces may be utilised to change an effective length of the operating member. The connecting piece(s) may be configured to connect an end of the operating member to another elongate member. The connecting piece or connecting pieces may be configured to provide two or more different connecting piece lengths between the end of the operating member and the other elongate member, Alternatively, the length of the operating member may be adjustable to have any length within a range of lengths.

The ablutionary fitting may comprise a means operable to provide a principal stream of fluid, e.g. water, having a user-desired temperature. The means operable to provide the principal stream of fluid having the user-desired temperature may include, for example, a mixer valve, e.g. a thermostatic mixer valve, or an instantaneous water heater.

A second aspect provides a controller for use in a plumbing system or an ablutionary system, wherein the controller comprises a user input means operably connected to the operating member of a fluid flow control valve assembly according to the first aspect.

The user input means may include, for example, a touch-screen, a button, a lever or a rotary control member such as a rotary dial.

In an implementation, the user input means may comprise a rotary control member having a cam surface, the cam surface being configured to cause directly or indirectly linear movement of the operating member when a user rotates the rotary control member.

The controller may be a shower controller.

A third aspect provides a plumbing system or an ablutionary system comprising a fluid flow control valve assembly according to the first aspect and/or a controller according to the second aspect.

The plumbing system or the ablutionary system may comprise one or more fluid delivery devices downstream of the fluid control valve assembly.

The plumbing system or the ablutionary system may comprise a shower system.

Except where mutually exclusive, any of the features of any of the above described aspects may be employed mutatis mutandis in any of the other above described aspects.

FIG. 1 shows an example of a shower controller 1. The shower controller 1 is configured to be fixed to a surface such as a wall.

The shower controller 1 comprises a casing 2. The casing 2 is configured to shroud one or more fluid handling components and plumbing connections. The casing 2 may thus provide protect the one or more fluid handling components and plumbing connections from accidental damage or dirt ingress. The casing 2 may also provide the shower controller 1 with a desired appearance. The shape and dimensions of the casing 2 may be varied to provide different appearances, in order to provide different design aesthetics without necessarily having to change the arrangement of the one or more fluid handling components and plumbing connections shrouded by the casing 2.

Typically, the casing 2 may shroud a thermostatic mixer valve (not shown). The thermostatic mixer valve may be connected to a supply of hot water and to a supply of cold water. The thermostatic mixer valve operates to mix the hot water and the cold water to produce a principal stream having a user-desired temperature. The principal stream having the user-desired temperature is then conveyed from an outlet of the thermostatic mixer valve to a fluid delivery device (not shown) such as a shower head downstream of the thermostatic mixer valve.

The shroud 2 generally comprises a front surface 8, a side wall 9 extending in a rearward direction from the front surface 8 and an open end opposite the front surface 8.

On the front surface 8 of the shower controller 1 there is a button 3 for turning on and off flow to the fluid delivery device. The button 3 may be operably coupled to an on-off valve having a first state that allows flow to the fluid delivery device and a second state that prevents flow to the fluid delivery device.

The shower controller 1 further comprises a first rotary control member 4 and a second rotary control member 5 disposed forward of the front surface 8. The first rotary control member 4 is disposed forward of the second rotary control member 5, i.e. the first rotary control member is further from the front surface 8 than the second rotary control member 5.

The first rotary control member 4 provides temperature control. The second rotary control member 5 provides flow control.

The first rotary control member 4 comprises a first handle 6 to facilitate use thereof. The second rotary control member 5 comprises a second handle 7 to facilitate use thereof. The first rotary control member 4 and the second rotary control member 5 are configured to be rotatable about a common rotation axis normal to the front surface 8.

The first rotary control member 4 is operably connected to the thermostatic mixer valve.

As will be described in more detail herein, the second rotary control member 5 is operably connected to a fluid flow control valve assembly downstream of the outlet of the thermostatic mixer valve.

Figure 2:
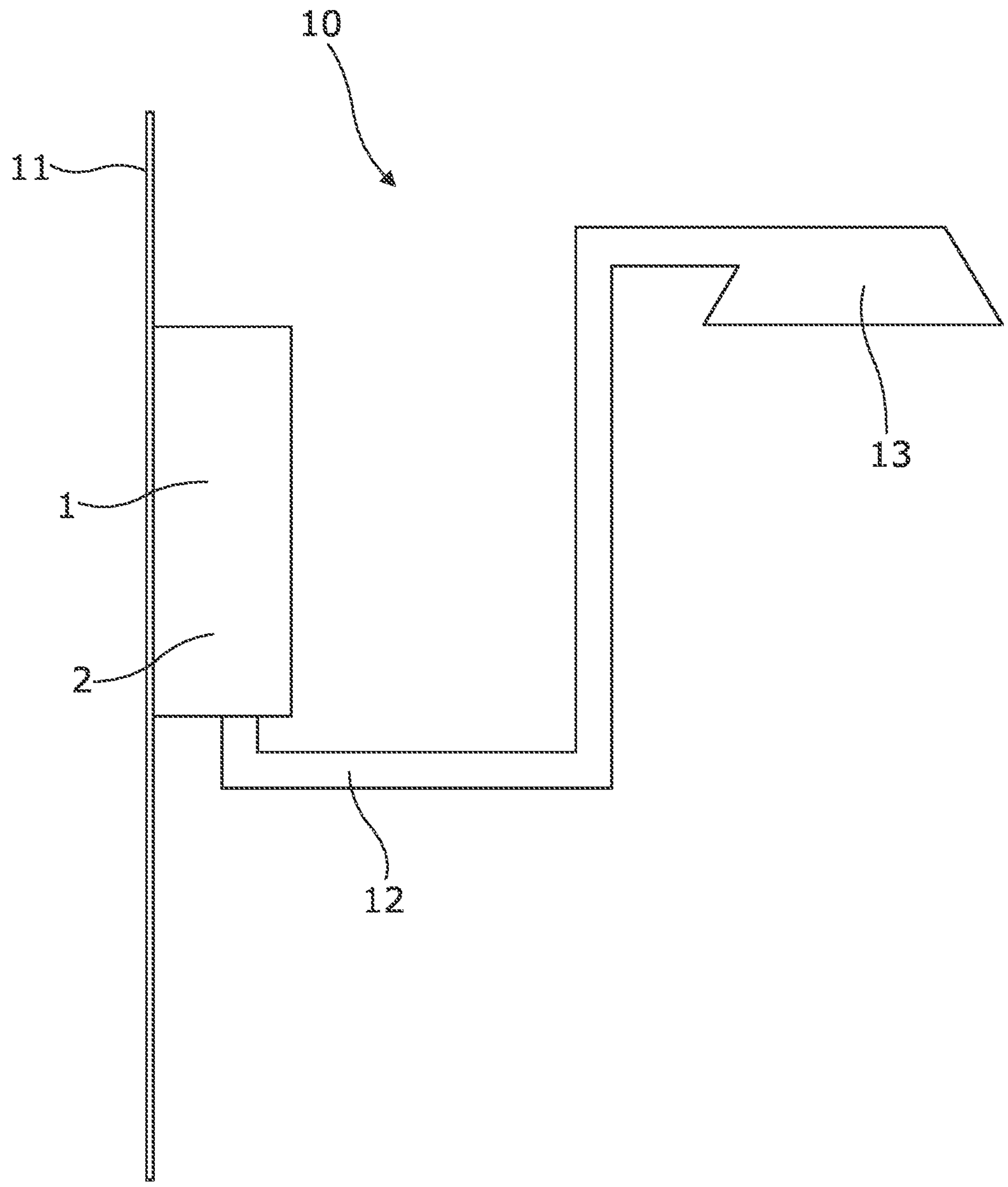
FIG. 2 shows an example of a shower system.
Figure 3:
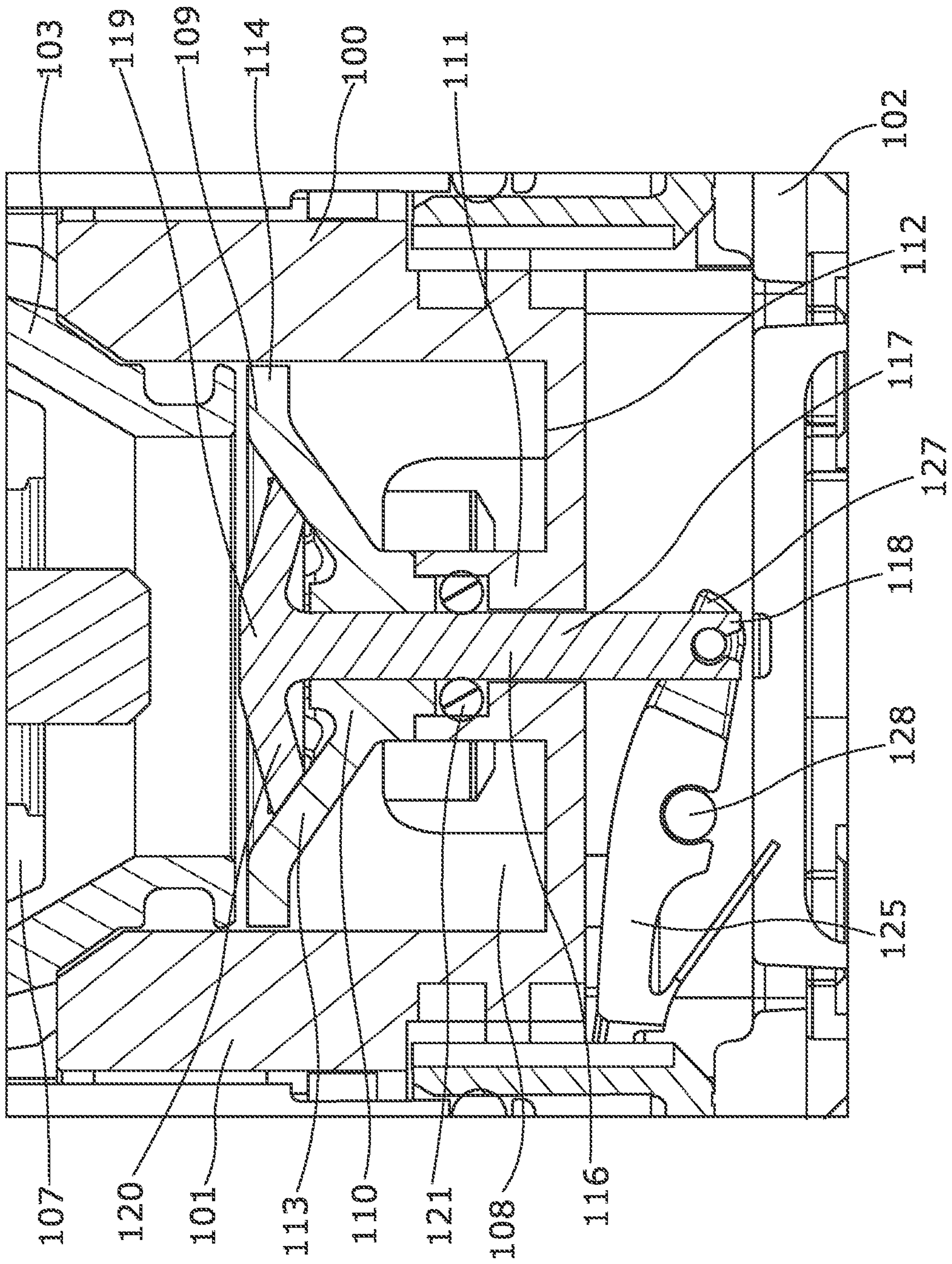
FIG. 3 is a cross-sectional view of a portion of an example of a fluid flow control valve assembly.
Figure 4:
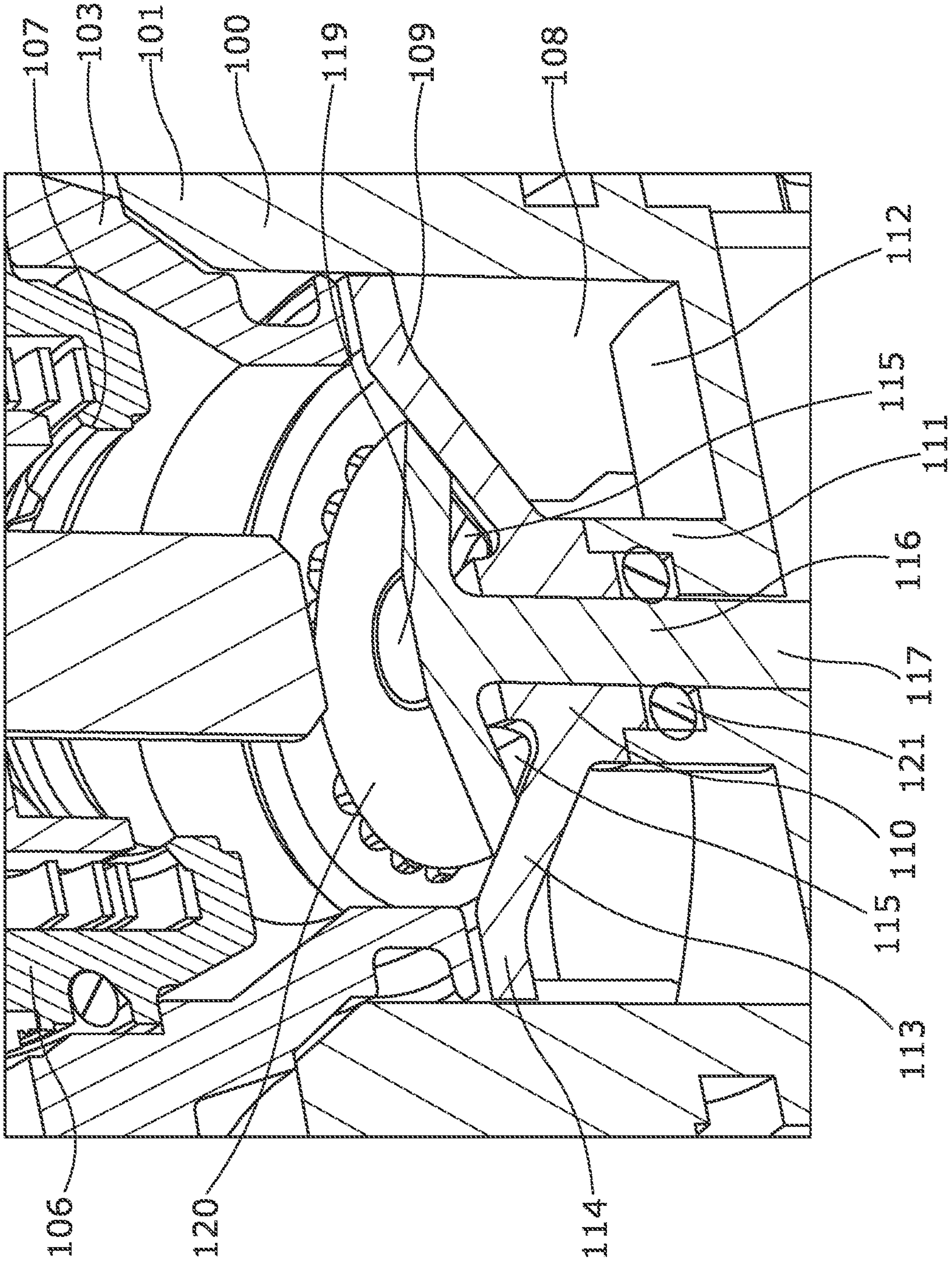
FIG. 4 is another cross-sectional view of a portion an example fluid flow control valve assembly.

FIG. 2 illustrates schematically an example of a shower system 10 comprising the shower controller 1. The shower controller 1 is mounted on a wall 11.

The casing 2 shrouds a thermostatic mixer valve (not shown). The thermostatic mixer valve is connected to a supply of hot water and to a supply of cold water. The thermostatic mixer valve operates to mix the hot water and the cold water to produce a principal stream having a user-desired temperature. The principal stream having the user-desired temperature is then conveyed from an outlet of the thermostatic mixer valve via a shower hose 12 to a shower head 13 downstream of the thermostatic mixer valve. A fluid flow control valve assembly (not shown) according to the present disclosure located downstream of the outlet of the thermostatic mixer valve is operable to control a flow of water from the outlet of the thermostatic mixer valve to the shower hose 12 and the shower head 13 connected thereto.

Referring to FIGS. 3, 4, 5 and 6, there is shown an example of a fluid flow valve assembly 100.

The fluid flow valve assembly 100 comprises a body 101 attached to a mounting plate 102 adapted to be fixed, in use, to a surface such as a wall. A thermostatic mixer valve assembly 103 is attached to the body 101 of the fluid flow valve assembly 100. The body 101 is disposed between the mounting plate 102 and the thermostatic mixer valve assembly 103.

The thermostatic mixer valve assembly 103 comprises a first inlet 104 configured to be adapted to a first fluid supply pipe and a second inlet 105 configured to be adapted to a second fluid supply pipe. The first fluid supply pipe may convey cold water and the second fluid supply pipe may convey hot water or vice versa.

The thermostatic mixer valve assembly 103 comprises a thermostatic mixer valve cartridge 106 including a thermostatic mixer valve. The thermostatic mixer valve has a first valve inlet in fluid communication with the first inlet 104 and a second valve inlet in fluid communication with the second inlet 105. The thermostatic mixer valve operates to mix the hot water and the cold water to produce a principal stream having a user-desired temperature. The thermostatic mixer valve has an outlet 107 through which the principal stream having the user-desired temperature exits the thermostatic mixer valve cartridge 106.

A waterway 108 within the body 101 is in fluid communication with the outlet 107. Disposed within the waterway 108 is a first flow control member 109. The first flow control member 109 extends across the waterway 108 and is fixed relative to the body 101. The first flow control member 109 comprises a hub portion 110 with a central aperture therethrough. The hub portion 110 is connected to a mount portion 111 protruding from a base 112 of the waterway 108 within the body 101.

The first flow control member 109 comprises a conical portion 113 extending radially outwards and upwards (i.e. in a direction away from the mount portion 111) from the hub portion 110 to a rim 114.

A plurality of apertures 115 in the conical portion 113 each provide a fluid flow channel through the first flow control member 109.

The fluid flow control valve assembly 100 comprises a second flow control member 116 that is linearly moveable relative to the first flow control member 109. The second flow control member 116 comprises a shaft 117 having a first end 118 and a second end 119. From the first end 118 to the second end 119, the shaft 117 extends through an aperture in the mount portion 111 and the central aperture in the hub portion 110 of the first flow control member 109. The second flow control member 116 comprises a stopper portion 120 connected to the second end 119 of the shaft 117. The stopper portion 120 extends radially and downwardly from the second end 119 of the shaft 117. An O-ring 121 is disposed around the shaft 117 in a cavity defined by the mount portion 111 and the hub portion 110 of the first flow control member 109. The O-ring 121 provides a fluid-tight seal around the shaft 117.

An operating member 122 comprises a rod 123 received within a vertical channel in the body 101. The operating member 122 comprises a foot portion 124 extending laterally from a lower end of the rod 123. The foot portion 124 is perpendicular to the rod 123. The foot portion 124 protrudes from the vertical channel and passes through a vertical slot. An end of the foot portion 124 distal from the rod 123 sits on top of a first end 126 of a lever 125.

A second end 127 of the lever 125 is pivotally connected to the first end 118 of the shaft 117 of the second flow control member 116. The lever 125 is configured to pivot, in use, about a fulcrum 128 between the first end 126 of the lever 125 and the second end 127 of the lever 125. The distance from the first end 126 of the lever 125 to the fulcrum 128 is greater than the distance from the second end 127 of the lever 125 to the fulcrum 128.

A connecting piece 129 comprising a tubular member with a blind hole in each end is disposed on an upper end of the rod 123 of the operating member 122. The upper end of the rod 123 of the operating member 122 is received in one of the blind holes of the connecting piece 129. An end of another elongate member (not shown) is received in the other of the blind holes of the connecting piece 129. The other elongate member may be operably connected to a user input means (not shown) configured to cause linear movement of the other elongate member. The user input means may comprise, for example, a button, a lever, a slider or a rotary dial. For instance, the second rotary control member 5 (FIG. 1) may have a cam surface on an underside thereof, the cam surface being configured to act on the other elongate member to cause linear movement of the other elongate member in a substantially vertical direction when a user rotates the second rotary control member 5.

Figure 5:
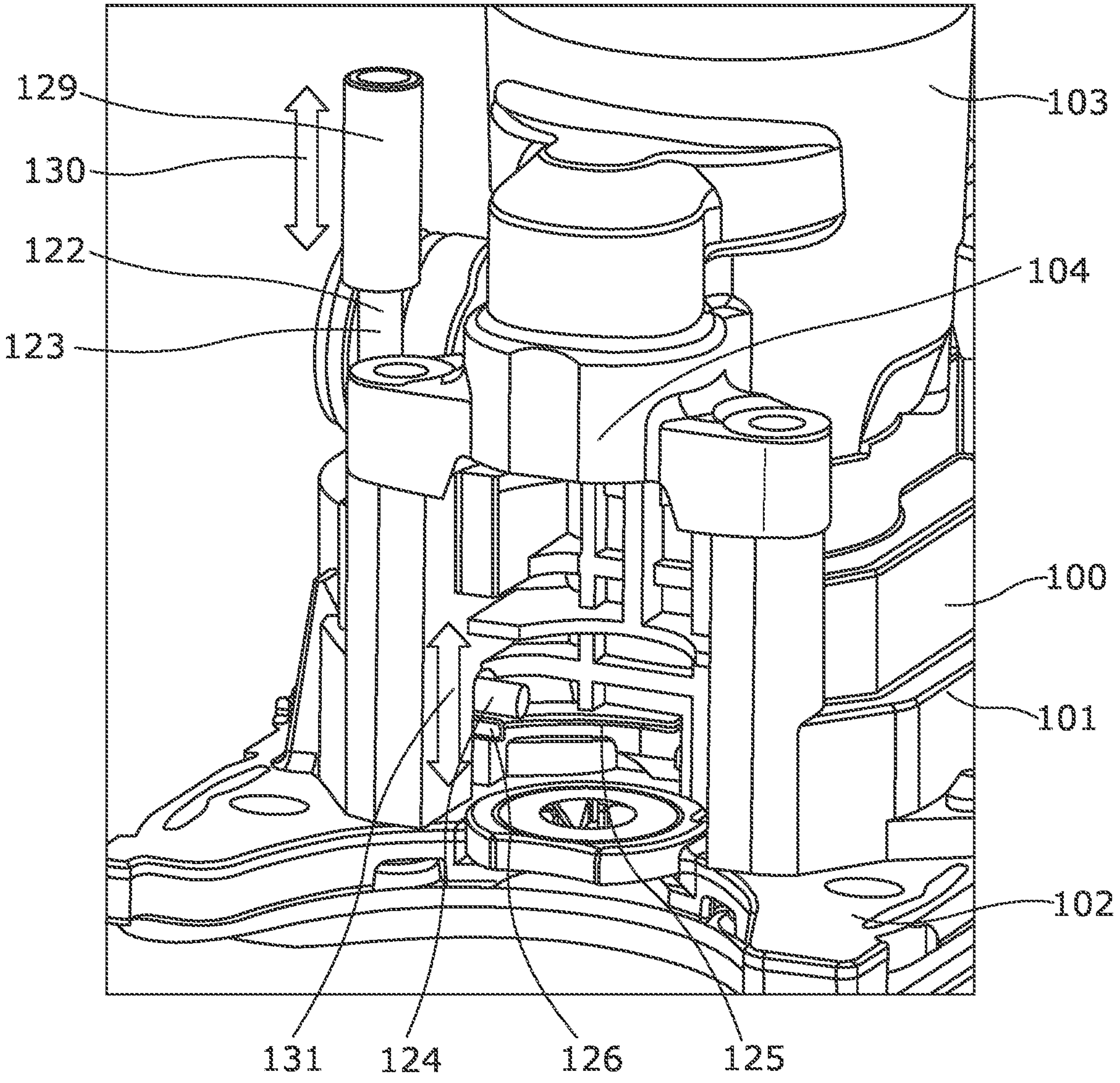
FIG. 5 is a side view of an example fluid flow control valve assembly.
Figure 6:
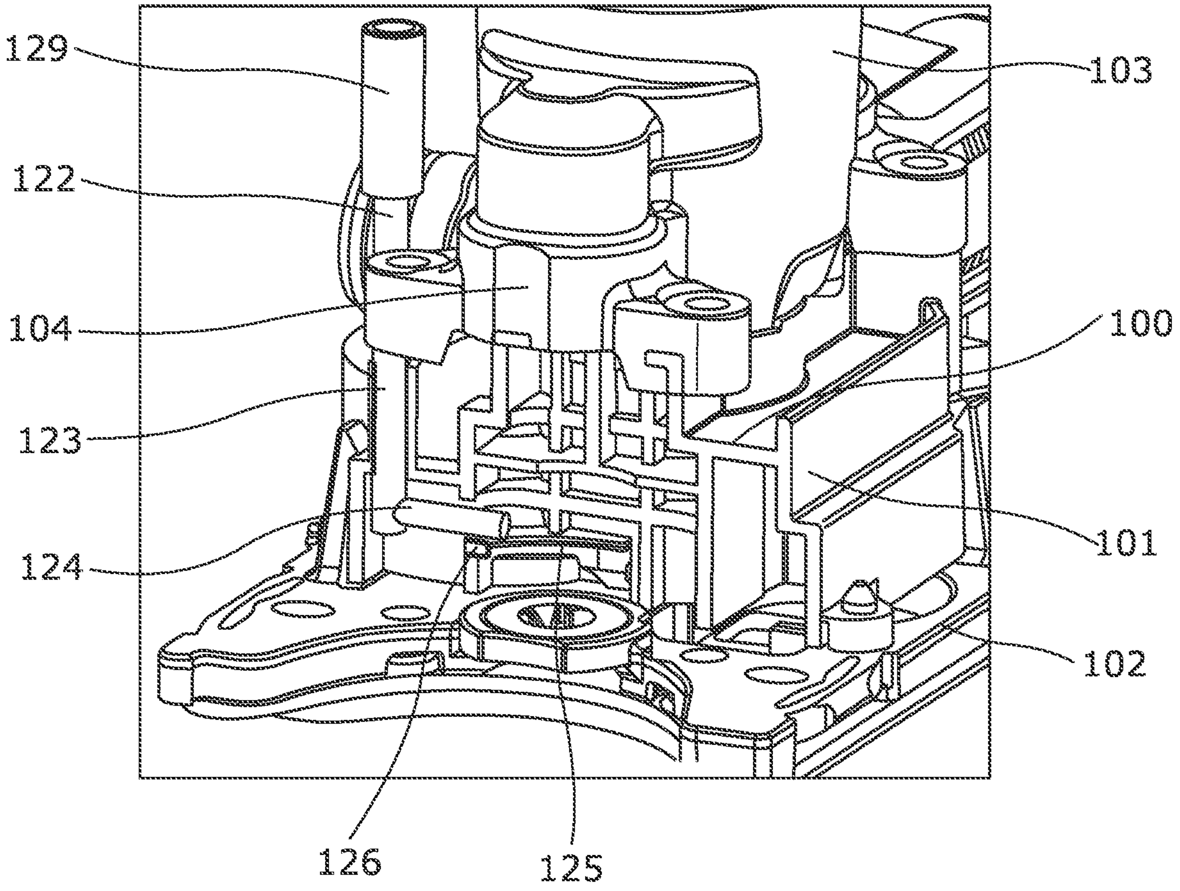
FIG. 6 is a partially cut-away side view of an example fluid flow control valve assembly.

With reference to FIG. 5, the linear movement of the other elongate member causes the linear movement of the operating member 122 in the vertical channel in the body 101, as indicated by a first block arrow 130. Consequently, the foot portion 124 of the operating member 122 acts on the first end 126 of the lever 125, as indicated by a second block arrow 131.

When, in use, the foot portion 124 of the operating member 122 pushes the first end 126 of the lever 125 down, the second flow control member 116 moves linearly in an upward direction relative to the first flow control member 109. Consequently, the stopper portion 120 provides less of an obstruction to fluid flow through the apertures 115 in the conical portion 113 of the first flow control member 109.

The lever 125 is biased against an underside of the foot portion 124 such that the first end 126 of the lever 125 remains in contact with the underside of the foot portion 124 during operation of the fluid flow control valve assembly 100. Hence, when, in use, the foot portion 124 of the operating member 122 moves upwards, the first end 126 of the lever 125 moves upwards and the second end 127 of the lever 125 acts on the second flow control member 116 to move the second flow control member 116 linearly in a downward direction relative to the first flow control member 109. Consequently, the stopper portion 120 provides more of an obstruction to fluid flow through the apertures 115 in the conical portion ll3 of the first flow control member 109. The operating member 122 and the lever 125 may be configured such that the second flow control member 116 has a range of movement from a first end state wherein the stopper portion 120 obstructs fluid flow through the apertures 115 of the first flow control member 109 to a greatest extent and a second end state wherein the stopper portion 120 obstructs fluid flow through the apertures 115 of the first flow control member 109 to a least extent.

Figure 7:
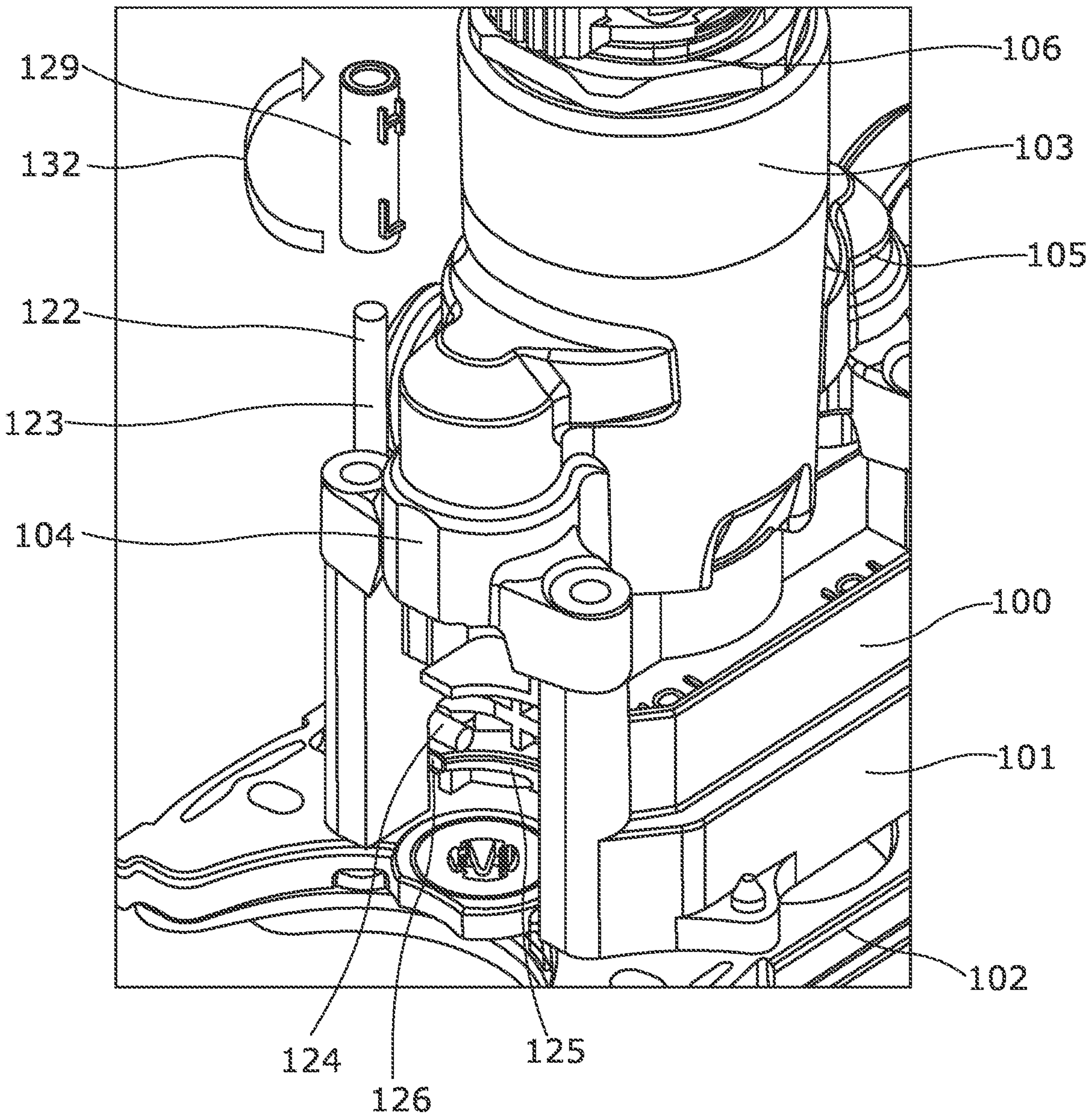
FIG. 7 illustrates a way of adjusting the effective length of the operating member of an example fluid flow control valve assembly.

With reference to FIG. 7, the connecting piece 129 may be configured such that an effective length of the operating member 122 may be varied, e.g. by inverting the connecting piece 129, as indicated by a third block arrow 132. Alternatively or additionally, the effective length of the operating member 122 may be varied by substituting the connecting piece 129 with a different connecting piece, in which the relative depths of the blind holes are different.

It will be appreciated that use of the connecting piece 129 in this way is only one example of a way of adjusting the length of the operating member 122. Other ways of adjusting the length of the operating member 122 will be apparent to the person skilled in the art.

In some implementations, the connecting piece 129 and the other elongate member may not be present. In such an implementation, the user input means may act directly or indirectly on the upper end of the rod 123 of the operating member 122.

In some implementations, the length of the operating member 122 may not be adjustable.

Adjusting the length of the operating member 122 allows the positions of the first end state and the second end state of the range of movement of the second flow control member 116 to be changed. Therefore, the fluid flow control valve assembly 100 can be configured to provide better or more appropriate fluid flow control for a given application when being installed at a site of use. The selected configuration for providing better or more appropriate fluid flow control may depend, for example, on the pressure of the mains water supply at a given site of use.

Figure 8:
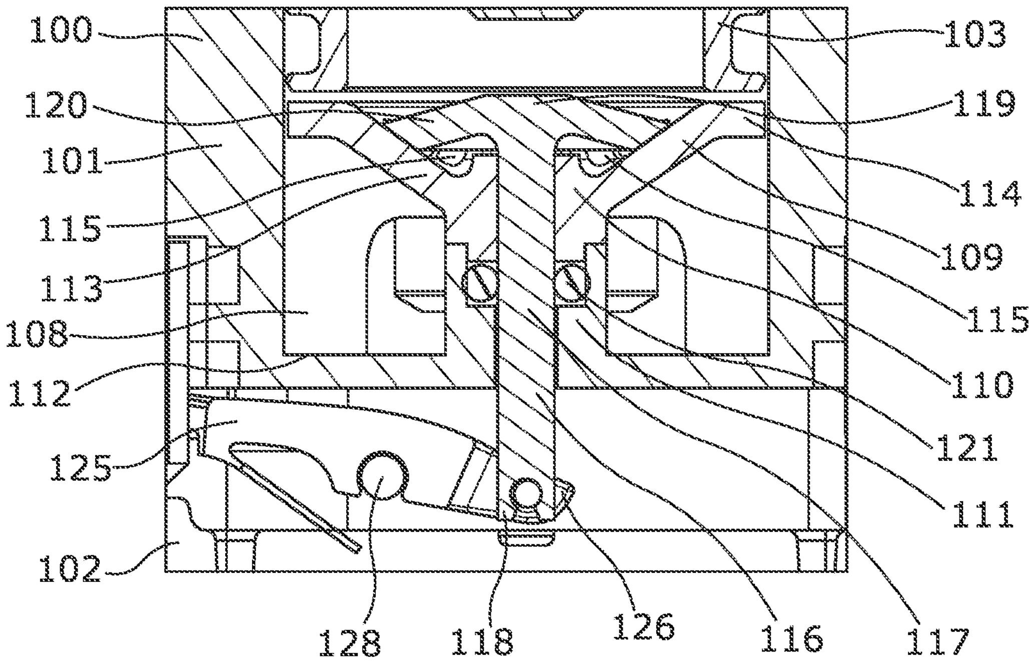
FIG. 8 is a sectional view of an example control valve assembly.
Figure 9:
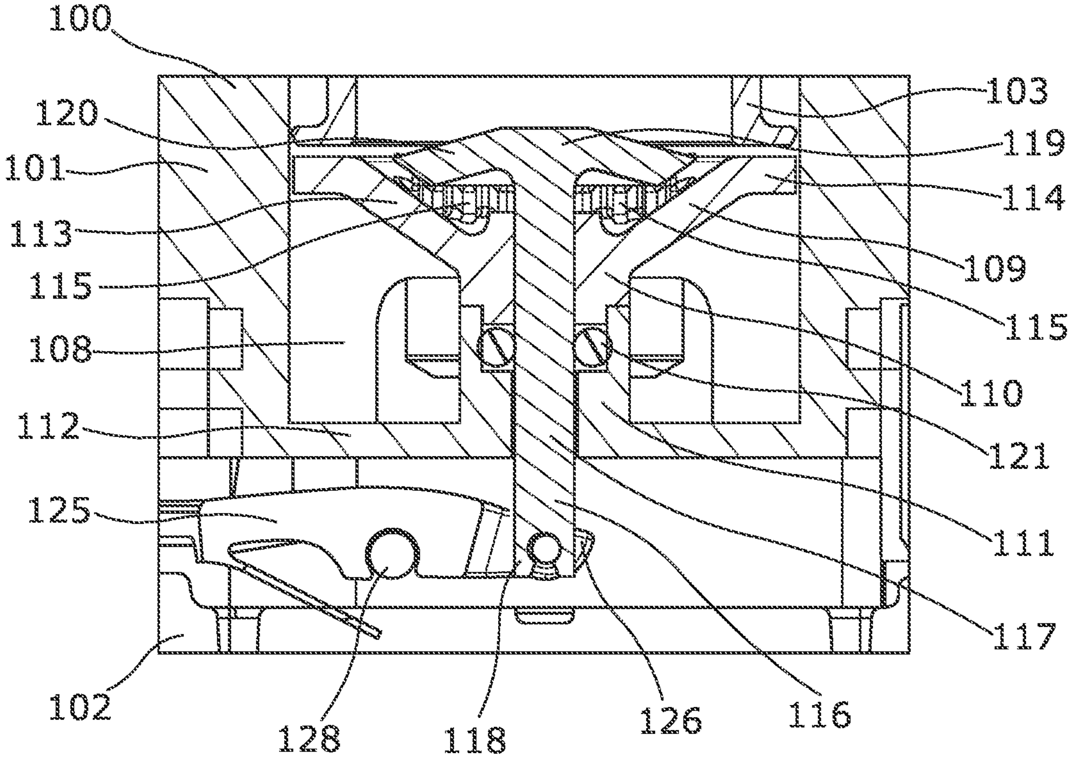
FIG. 9 is a sectional view of an example control valve assembly.
Figure 10:
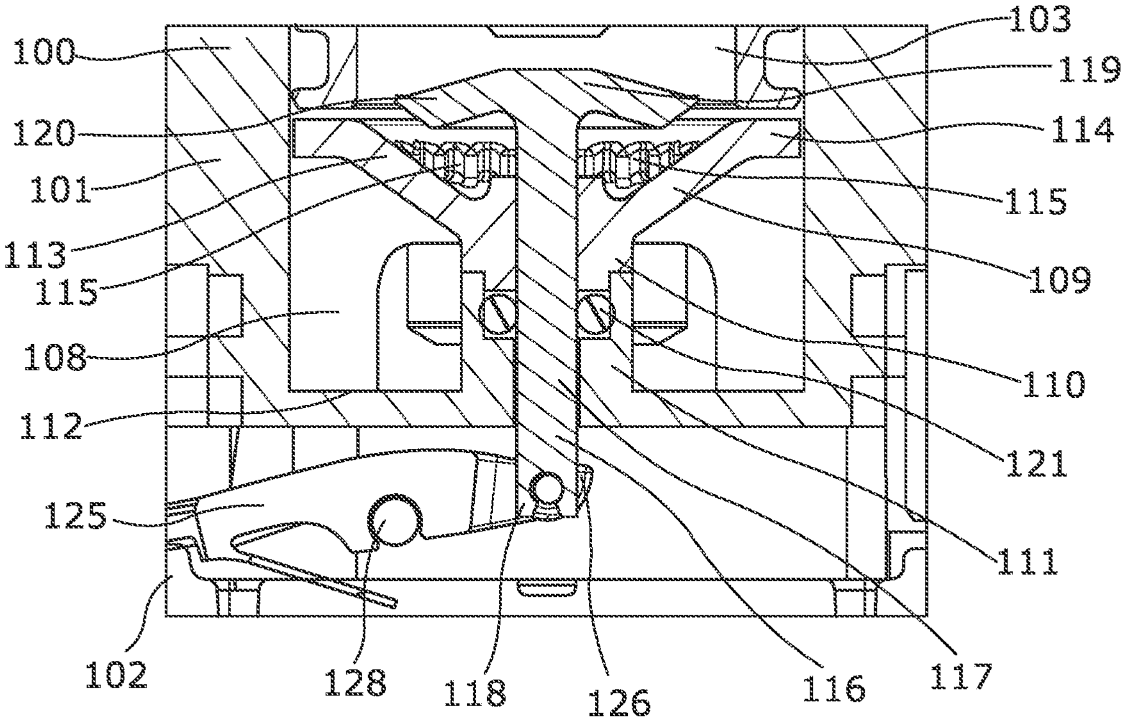
FIG. 10 is a sectional view of an example control valve assembly.

FIGS. 8, 9 and 10 show three sectional views of a portion of the fluid flow control valve assembly 100 and illustrate how the first end state and the second end state of the range of movement of the second flow control member 116 can be changed by adjusting the effective length of the operating member 122, e.g. by using the connecting piece 129. In this example, the connecting piece 129 is configured such that the operating member has a first effective length when the connecting piece 129 is in a first orientation and a second effective length when the connecting piece 129 has been inverted such that the connecting piece is in a second orientation. In this example, the second effective length of the operating member 122 is longer than the first effective length of the operating member 122.

FIG. 8 illustrates a scenario wherein the operating member 122 has the first effective length. The second flow control member 116 is shown in the first end state wherein the stopper portion 120 obstructs fluid flow through the apertures 115 of the first flow control member 109 to the greatest extent. The stopper portion 120 is resting on the conical portion 113 of the first flow control member 109.

FIG. 9 further illustrates the scenario wherein the operating member 122 has the first effective length. The second flow control member 116 is shown in the second end state wherein the stopper portion 120 obstructs fluid flow through the apertures 115 of the first flow control member 109 to the least extent. There is a gap between the stopper portion 120 and the conical portion 113 of the first flow control member 109.

The scenarios illustrated in FIGS. 8 and 9 may be appropriate for providing fluid flow control at a site of use having a high pressure mains water supply. It will be appreciated that FIG. 8 illustrates the lowest flow condition and FIG. 9 illustrates the highest flow condition through the fluid flow control valve assembly 100 with the operating member 122 having the first effective length.

Alternatively, FIG. 9 may illustrate a scenario wherein the operating member 122 has the second effective length. The second flow control member 116 is shown in the first end state wherein the stopper portion 120 obstructs fluid flow through the apertures 115 of the first flow control member 109 to the least extent. There is a gap between the stopper portion 120 and the conical portion 113 of the first flow control member 109.

FIG. 10 further illustrates the scenario wherein the operating member 122 has the second effective length. The second flow control member 122 is shown in the second end state wherein the stopper portion 120 obstructs fluid flow through the apertures 115 of the first flow control member 109 to the least extent. There is a larger gap between the stopper portion 120 and the conical portion 113 of the first flow control member 109.

The alternative scenario illustrated in FIG. 9 and FIG. 10 may be appropriate for providing fluid flow control at a site of use having a low pressure mains water supply. It will be appreciated that FIG. 9 illustrates the lowest flow condition and FIG. 10 illustrates the highest flow condition through the fluid flow control valve assembly 100 with the operating member 122 having the second effective length.

Figure 11:
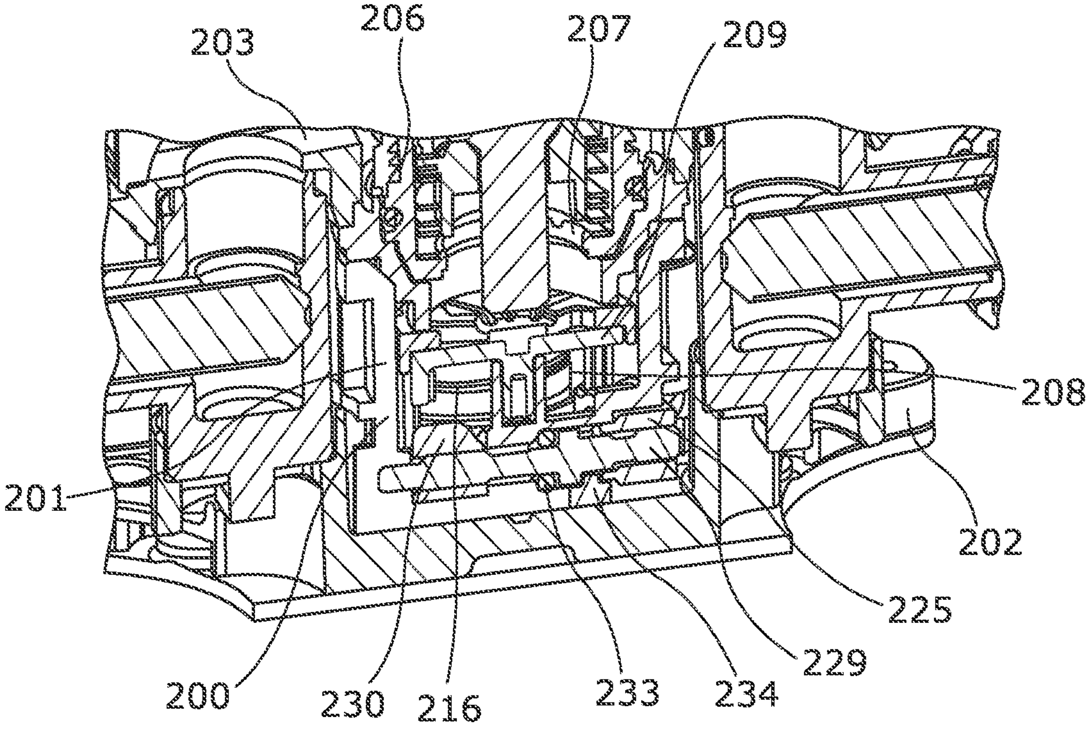
FIG. 11 shows a cross-sectional view of a portion of another example of a fluid flow control valve assembly.
Figure 12:
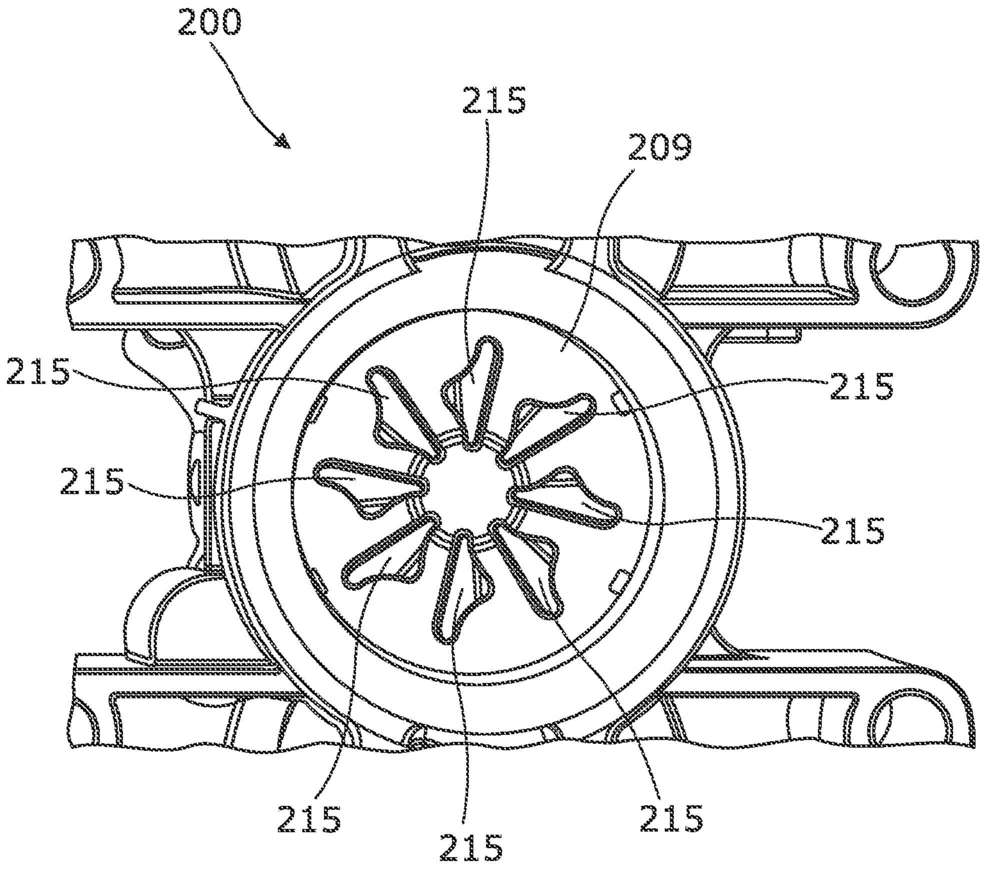
FIG. 12 is a cross-sectional view looking down on the first flow control member of an example fluid control valve assembly.
Figure 13:
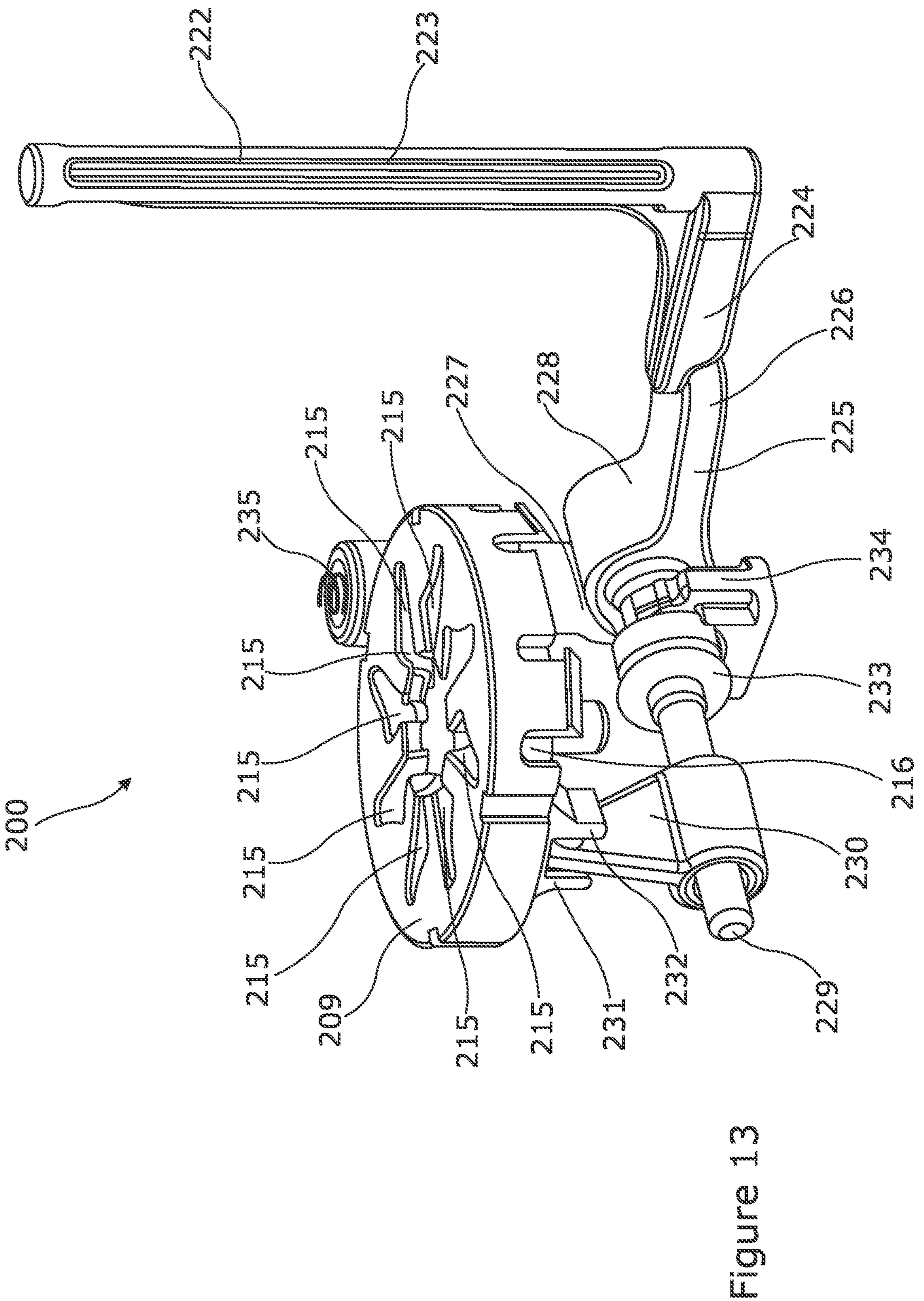
FIG. 13 shows a mechanism that operates an example fluid flow control valve assembly.

Referring to FIGS. 11, 12 and 13, there is shown another example of a fluid flow control valve assembly 200.

The fluid flow valve assembly 200 comprises a body 201 attached to a mounting plate 202 adapted to be fixed, in use, to a surface such as a wall. A thermostatic mixer valve assembly 203 is attached to the body 201 of the fluid flow valve assembly 200. The body 201 is disposed between the mounting plate 202 and the thermostatic mixer valve assembly 203.

The thermostatic mixer valve assembly 203 comprises a first inlet configured to be adapted to a first fluid supply pipe and a second inlet configured to be adapted to a second fluid supply pipe. The first fluid supply pipe may convey cold water and the second fluid supply pipe may convey hot water or vice versa.

The thermostatic mixer valve assembly 203 comprises a thermostatic mixer valve cartridge 206 including a thermostatic mixer valve. The thermostatic mixer valve has a first valve inlet in fluid communication with the first inlet and a second valve inlet in fluid communication with the second inlet. The thermostatic mixer valve operates to mix the hot water and the cold water to produce a principal stream having a user-desired temperature. The thermostatic mixer valve has an outlet 207 through which the principal stream having the user-desired temperature exits the thermostatic mixer valve cartridge 206.

A waterway 208 within the body 201 is in fluid communication with the outlet 207. Disposed within the waterway 208 is a first flow control member 209. The first flow control member 209 extends across the waterway 208 and is fixed relative to the body 201. A plurality of apertures 215 each provide a fluid flow channel through the first flow control member 209. The first flow control member 209 may be considered a first flow control plate.

The fluid flow control valve assembly 200 comprises a second flow control member 216 that is rotatable relative to the first control member 209. The second flow control member 216 may be considered a second flow control plate.

The second flow control member 216 is adjacent the first flow control member 209. As illustrated, the second flow control member 216 is beneath the first flow control member 209. The second flow control member 216 has apertures therethrough. As will be described in more detail below, rotation of the second flow control member 216 relative to the first flow control member 209 brings the apertures in the second flow control member 216 into or out of alignment with the apertures 215 in the first flow control member 209 to permit more fluid flow or less fluid flow respectively. The apertures in the first flow control member 209 and the second flow control member 216 are configured such that bringing them into or out of alignment with each other provides continuous and gradual fluid flow control, i.e. substantially free of any sudden, relatively large increases or decreases, e.g. step changes, in fluid flow.

The first flow control member 209 may be made from a plastics material or a ceramic material. The second flow control member 216 may be made from a plastics material or a ceramic material.

With reference, in particular, to FIG. 13, an operating member 222 comprises a rod 223 received within a vertical channel (not shown) in the body 201 (FIG. 11). The operating member 222 comprises a foot portion 224 extending laterally from a lower end of the rod 223. The foot portion 224 is perpendicular to the rod 223. The foot portion 224 protrudes from the vertical channel and passes through a vertical slot. An end of the foot portion 224 distal from the rod 223 sits on top of a first end 226 of a lever 225.

The lever 225 is configured to pivot, in use, about a fulcrum 228 between the first end 226 of the lever 225 and a second end 227 of the lever 225. The distance from the first end 226 of the lever 225 to the fulcrum 228 is greater than the distance from the second end 227 of the lever 225 to the fulcrum 228.

At the fulcrum 228, the lever 225 is connected to a first end of an axle 229 extending perpendicularly from the lever 225. A second end of the axle is attached to a paddle 230. A tip of the paddle 230 distal from the axle 229 is disposed between a first retaining projection 231 and a second retaining projection 232, each one of the first retaining projection 231 and the second retaining projection 232 extending downwardly from the second flow control member 216. The first and second retaining projections 231, 232 are spaced apart and dimensioned such that the tip of the paddle 230 is always located, in use, between the first and second retaining projections 231, 232.

At an intermediate point, an O-ring 233 surrounds the axle 229 to prevent fluid from escaping the waterway 208 (FIG. 11) and getting to the lever 225. At a point between the O-ring 233 and the first end of the axle 229, the axle 229 is mounted on a bearing 234.

A spring 235 is configured to act on the second end 227 of the lever 225 to bias the lever 225 such that the first end 226 of the lever 225 remains in contact with an underside of the foot portion 224 during operation of the fluid flow control valve assembly 200.

An upper end of the rod 223 may be acted upon directly or indirectly, e.g. in a manner similar to that described above in relation to the operation of the fluid flow control valve assembly 100, to cause linear movement of the operating member 222.

When, in use, the foot portion 224 pushes the first end 226 of the lever 225 down, the axle 229 is caused to rotate in an anticlockwise direction (when viewed from the first end of the axle 229). Consequently, the tip of the paddle 231 pushes against the second retaining projection 232 to cause clockwise rotation of the second flow control member 216 relative to the first flow control member 209 (when viewed from beneath the second flow control member 216.

When, in use, the operating member 222 move upwards, the spring 235 acts to push the first end 226 of the lever 225 up. Consequently, the axle 229 is caused to rotate in a clockwise direction (when viewed from the first end of the axle 229). Consequently, the tip of the paddle 230 pushes against the first retaining projection 231 to cause anticlockwise rotation of the second flow control member 216 relative to the first flow control member 209 (when viewed from beneath the second flow control member 216).

The length of the operating member 222 may or may not be adjustable. The length of the operating member 222 may be adjustable, e.g. in a manner similar to that described above in relation to the operation of the fluid flow control valve assembly 100.

Various modifications may be made to the example embodiments described herein without departing from the scope of the invention.

In some implementations, the first flow control member and the second flow control member may be arranged such that, in use, the fluid flow rate through the fluid flow control valve is always a non-zero value.

In some implementations, there may be more than one fluid delivery device downstream of the fluid flow control valve assembly. A diverter may be disposed downstream of the fluid flow control valve assembly to allow a user to select any combination of the fluid delivery devices at a given time. Alternatively, a fluid flow control valve assembly according to this disclosure may be disposed downstream of one or more of the outlets of the diverter, to allow a user to control flow to a downstream fluid delivery device.

Generally, the fluid flow control valve assemblies disclosed herein may be relatively simple mechanically. The fluid flow control valve assemblies disclosed herein may require only a relatively low force to actuate them, which may be beneficial for users, in particular, but not exclusively, users with reduced strength and/or manual dexterity. The fluid flow control valve assemblies disclosed herein may be employed with a variety of user input means, including, for example, a touchscreen, a button, a lever or a rotary dial. Accordingly, the fluid flow control valve assemblies disclosed herein may be utilised in or with a range of ablutionary or plumbing fittings having a variety of design aesthetics.

It will be understood that the invention is not limited to the embodiments described above. Various modifications and improvements can be made without departing from the concepts disclosed herein. Except where mutually exclusive, any of the features may be employed separately or in combination with any other features and the disclosure extends to all combinations and sub-combinations of one or more features disclosed herein.

The invention claimed is:

1. A fluid flow control valve assembly comprising:
a fluid flow control valve including:
a first flow control member having one or more flow channels, and
a second flow control member disposed adjacent to the first flow control member,
wherein the second flow control member is moveable relative to the first flow control member;
a first valve actuator causing movement of the second flow control member relative to the first flow control member; and
an operating member operably connected to the first valve actuator;
wherein, in use, the operating member moves in a linear direction and the operating member acts in turn on the first valve actuator to move the second flow control member,
wherein movement of the second flow control member adjusts a position of the second flow control member relative to the one or more flow channels in the first flow control member such that a flow rate through the fluid flow control valve may be increased or decreased, and
wherein a length of the operating member is adjustable.

2. The fluid flow control valve assembly according to claim 1, wherein the flow rate through the fluid flow control valve is always a non-zero value.

3. The fluid flow control valve assembly according to claim 1, wherein the first valve actuator comprises a lever.

4. The fluid flow control valve assembly according to claim 1, wherein the first valve actuator causes linear movement of the second flow control member relative to the first flow control member.

5. The fluid flow control valve assembly according to claim 1, wherein the second flow control member is rotatable about an axis perpendicular to the second flow control member.

6. The fluid flow control valve assembly according to claim 1, wherein the one or more flow channels comprise an aperture passing through the first flow control member.

7. The fluid flow control valve assembly according to claim 1, wherein the length of the operating member is adjustable between a plurality of discrete lengths.

8. The fluid flow control valve assembly according to claim 7, wherein one or more connecting pieces connect an end of the operating member to another elongate member.

9. The fluid flow control valve assembly according to claim 8, wherein the one or more connecting pieces provide two or more different connecting piece lengths between the end of the operating member and the other elongate member.

10. The fluid flow control valve assembly according to claim 1, wherein an ablutionary fitting provides a principal stream of fluid having a user-desired temperature.

11. A controller comprising:
a fluid control valve assembly including:

a fluid flow control valve including:

a first flow control member having one or more flow channels, and a second flow control member disposed adjacent to the first flow control member, wherein the second flow control member is moveable relative to the first flow control member;

a first valve actuator causing movement of the second flow control member relative to the first flow control member, wherein the first valve actuator causes rotation of the second flow control member relative to the first flow control member; and an operating member operably connected to the first valve actuator;

wherein, in use, the operating member moves in a linear direction and the operating member acts in turn on the first valve actuator to move the second flow control member, and wherein movement of the second flow control member adjusts a position of the second flow control member relative to the one or more flow channels in the first flow control member such that a flow rate through the fluid flow control valve may be increased or decreased; and a user input device operably connected to the operating member of the fluid control valve assembly.

12. The controller according to claim 11, wherein:

the user input device includes a touchscreen, a button, a lever, or a rotary control member, or the user input device includes a rotary control member having a cam surface, the cam surface directly or indirectly causing linear movement of the operating member when a user rotates the rotary control member.

13. The controller according to claim 11, wherein the flow rate through the fluid flow control valve is always a non-zero value.

14. The controller according to claim 11, wherein the first valve actuator comprises a lever.

15. The controller according to claim 11, wherein the first valve actuator causes linear movement of the second flow control member relative to the first flow control member.

16. A plumbing system or an ablutionary system comprising:

a fluid flow control valve assembly including:

a fluid flow control valve including:

a first flow control member having one or more flow channels, and a second flow control member disposed adjacent to the first flow control member, wherein the second flow control member is moveable relative to the first flow control member;

a first valve actuator causing movement of the second flow control member relative to the first flow control member; and an operating member operably connected to the first valve actuator;

wherein, in use, the operating member moves in a linear direction and the operating member acts in turn on the first valve actuator to move the second flow control member, wherein movement of the second flow control member adjusts a position of the second flow control member relative to the one or more flow channels in the first flow control member such that a flow rate through the fluid flow control valve may be increased or decreased, and wherein a length of the operating member is adjustable, and wherein the length of the operating member is adjustable to have any length within a range of lengths; and a controller including a user input device operably connected to the operating member of the fluid flow control valve assembly.

17. The plumbing system or ablutionary system of claim 16, including one or more fluid delivery devices downstream of the fluid flow control valve assembly.

* * * * *